(12) United States Patent
Hwang et al.

(10) Patent No.: US 12,145,479 B2
(45) Date of Patent: Nov. 19, 2024

(54) SEAT RAIL LOCKING DEVICE FOR VEHICLE

(71) Applicant: HYUNDAI TRANSYS INC., Seosan-si (KR)

(72) Inventors: Seong Jun Hwang, Hwaseong-si (KR); Heoung Su Lim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 296 days.

(21) Appl. No.: 17/808,433

(22) Filed: Jun. 23, 2022

(65) Prior Publication Data
US 2023/0001827 A1   Jan. 5, 2023

(30) Foreign Application Priority Data
Jul. 1, 2021   (KR) ........................ 10-2021-0086539

(51) Int. Cl.
*B60N 2/07*   (2006.01)
*B60N 2/08*   (2006.01)

(52) U.S. Cl.
CPC ......... *B60N 2/0806* (2013.01); *B60N 2/0715* (2013.01); *B60N 2/0818* (2013.01)

(58) Field of Classification Search
CPC ... B60N 2/0806; B60N 2/0818; B60N 2/0875
See application file for complete search history.

(56) References Cited

U.S. PATENT DOCUMENTS

| 6,113,051 A | * | 9/2000 | Moradell | B60N 2/0715 296/68.1 |
| 10,759,309 B2 | * | 9/2020 | Flick | B60N 2/0875 |
| 11,225,173 B2 | * | 1/2022 | Poptani | B60N 2/0818 |
| 11,731,536 B2 | * | 8/2023 | Hwang | B60N 2/0705 248/429 |
| 11,833,932 B2 | * | 12/2023 | Hwang | B60N 2/0818 |
| 2004/0188586 A1 | * | 9/2004 | Jaudouin | B60N 2/08 248/429 |
| 2009/0289485 A1 | | 11/2009 | Walter et al. | |

(Continued)

FOREIGN PATENT DOCUMENTS

FR   2910392 A1   6/2008
KR   101330025 B1   11/2013
(Continued)

OTHER PUBLICATIONS

Korean Notice of Allowance dated Sep. 15, 2022; Appln. No. 10-2021-0086539.

*Primary Examiner* — Gregory A Blankenship

(57) ABSTRACT

The present disclosure provides a seat rail locking device for a vehicle, which may apply a method of moving a lock pin in an upward direction to lock a seat rail by moving away from a conventional seat rail locking method of moving the lock pin in a directly downward direction to pass through a floor panel, thereby not causing the interference with the floor panel at all to flexibly apply a battery mounting structure to the floor panel, improving an assembling property as an operator may easily assemble a lock pin guide configured to guide the lock pin to move in upward and downward directions to a movable rail with only one-touch operation, and preventing the lock pin from being damaged or separated by mounting a cap at an upper end of the lock pin.

8 Claims, 6 Drawing Sheets

(56) References Cited

U.S. PATENT DOCUMENTS

| | | | |
|---|---|---|---|
| 2014/0145054 A1* | 5/2014 | Yamada | B60N 2/07 248/429 |
| 2014/0263920 A1* | 9/2014 | Anticuar | B60N 2/0715 248/429 |
| 2019/0184859 A1 | 6/2019 | Flick et al. | |
| 2020/0001745 A1* | 1/2020 | Shimizu | B60N 2/075 |
| 2020/0039390 A1* | 2/2020 | Flick | B21D 53/88 |
| 2021/0061137 A1* | 3/2021 | Flick | B60N 2/0875 |
| 2022/0314841 A1* | 10/2022 | Hwang | B60N 2/0818 |
| 2022/0410765 A1* | 12/2022 | Hwang | B60N 2/0818 |
| 2023/0001827 A1* | 1/2023 | Hwang | B60N 2/0881 |
| 2024/0109461 A1* | 4/2024 | Kim | B60N 2/0818 |

FOREIGN PATENT DOCUMENTS

| | | |
|---|---|---|
| KR | 1020150077702 A | 7/2015 |
| KR | 1020190078360 A | 7/2019 |
| KR | 1020190078362 A | 7/2019 |
| KR | 1020200002321 A | 1/2020 |

* cited by examiner

[ LOCKING STATE ]

SEAT RAIL LOCKING DEVICE FOR VEHICLE

This application claims the benefit of Korean Patent Application No. 10-2021-0086539 filed on Jul. 1, 2021, the entireties of which are hereby incorporated herein by reference.

BACKGROUND

(a) Technical Field

The present disclosure relates to a seat rail locking device for a vehicle, and more specifically, to a seat rail locking device for a vehicle, which newly improves a conventional seat rail locking method of moving a lock pin in a directly downward direction to pass through a floor panel to a method of locking a seat rail by moving the lock pin in an upward direction.

(b) Background Art

As is well known, seats for a vehicle are basically configured to include a seat cushion on which a passenger's lower body is seated, a seatback on which the passenger's upper body leans, and a headrest for supporting the passenger's neck and head.

The seats for a vehicle are mounted on a floor panel inside the vehicle by a seat rail including a fixed rail and a movable rail so that the front and rear locations may be adjusted.

To this end, the fixed rail (lower rail) in a configuration of the seat rail is fixedly mounted on the floor panel via a mounting bracket and a bolt, and the movable rail (upper rail) assembled with the seat cushion is fastened to the fixed rail to be movable in forward and backward directions.

In addition, a seat rail locking device for locking and unlocking the movable rail is mounted across the fixed rail and the movable rail.

Here, a conventional manual type seat rail locking device will be described as follows.

FIGS. 1 and 2 show the conventional manual type seat rail locking device, in which FIG. 1 is a cross-sectional diagram showing a locking state of the seat rail, and FIG. 2 is a cross-sectional diagram showing an unlocking state of the seat rail.

As shown in FIGS. 1 and 2, a seat rail 10 is configured to include a fixed rail 12 fixedly mounted on a floor panel 30, and a movable rail 14 fastened to the fixed rail 12 to be movable in forward and backward directions.

In addition, a seat rail locking device for locking and unlocking the movable rail is installed across the fixed rail 12 and the movable rail 14.

The seat rail locking device is configured to include a support plate 21 having a top connected to a seat cushion frame (not shown), and a bottom coupled to the movable rail 14; a lock pin 22 inserted into the support plate 21 and the movable rail 14 to be movable in upward and downward directions; a spring 23 inserted between a bottom surface of the support plate 21 and a circumferential part 22-1 of the lock pin 22 to be compressible; and a track lever 24, one end of which is formed with a folding part 24-1 for unlocking located at a bottom of the circumferential part 22-1 of the lock pin 22, the other end of which is formed with a handle part 24-2 foldable by a user, and an intermediate portion of which is fastened to the support plate 21 by a hinge 24-3.

At this time, the fixed rail 12 is formed with a locking hole 12-1 into which a lower end of the lock pin 22 is lockably inserted.

In addition, a stopper plate 25 provided in a structure in which the lock pin 22 passes through to be movable in upward and downward directions to limit a descending distance of the lock pin 22 is further disposed between the fixed rail 12 and the movable rail 14, and a circumferential portion of the lock pin 22 is further formed with a stopper part 22-2 caught to the stopper plate 25.

A structure of the conventional manual rail lock system has a structure in which at least one lock pin is locked using a plurality of lock pins for customer safety.

Accordingly, when the lower end of the lock pin 22 is locked to and inserted into the locking hole 12-1 of the fixed rail 12 passing through the stopper plate 25 as the lock pin 22 is pushed in a downward direction by an elastic restoring force of the spring 23, as shown in FIG. 1, the lock pin 22 is in a state of being restricted in forward and backward directions, and an upper end of the lock pin 22 is in a state of passing through and being inserted into the support plate 21 and the movable rail 14, and as a result, the movable rail 14 is in a locking state of not being movable along the fixed rail 12 in forward and backward directions.

On the other hand, when a user holds and folds the handle part 24-2 of the track lever 24 in an unlocking direction, the track lever 24 is rotated in the unlocking direction around the hinge 24-3 and at the same time, the folding part 24-1 for unlocking of the track lever 24 pushes the bottom of the circumferential part 22-1 of the lock pin 22 in an upward direction, so that as shown in FIG. 2, the lock pin 22 moves in the upward direction and at the same time, the lower end of the lock pin 22 escapes from the locking hole 12-1 of the fixed rail 12, and as a result, the movable rail 14 is in an unlocking state of being movable along the fixed rail 12 in forward and backward directions.

At this time, when the user releases the handle part 24-2 of the track lever 24, the lock pin 22 is pushed in a downward direction again by the elastic restoring force of the spring 23 and at the same time, the lower end of the lock pin 22 moves in a directly downward direction and is locked to and inserted into the locking hole 12-1 of the fixed rail 12, so that the movable rail 14 is in a locking state of not being movable along the fixed rail 12 in the forward and backward directions.

For reference, one lock pin 22 is shown in the cross-sectional diagrams of FIGS. 1 and 2, but a plurality of lock pins 22 are really arranged in the forward and backward directions, and the movable rail may be locked even when only one of the plurality of lock pins 22 is inserted into and fastened to the locking hole 12-1 of the fixed rail 12.

Since the above-described conventional manual type seat rail locking device has the structure in which the lock pin 22 moves in the directly downward direction so that the lower end thereof is inserted into and fastened to the locking hole 12-1 of the fixed rail 12, as shown in FIG. 1, the lower end of the lock pin 22 may come into contact with the floor panel 30 on which the fixed rail 12 is mounted through the locking hole 12-1 of the fixed rail 12.

Accordingly, the lower end of the lock pin 22 may be pressed by dispersion of the floor panel 30 and the like, thereby not properly locking the lock pin 22.

In addition, as the release of electric vehicles is generalized, a bottom space of the floor panel 30 and the like may be used as a battery mounting space, and the lower end of the lock pin 22 is pressed by coming into contact with the floor panel 30 through the locking hole 12-1 of the fixed rail 12, which may serve as an interference factor while a battery is packaged on the floor panel.

Accordingly, there is a need for the method of moving and locking the lock pin in an upward direction to not only reduce the number of parts and improve an assembling property, but also prevent the interference with the floor panel by moving away from the method of moving and locking the lock pin in the directly downward direction.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure has been made in efforts to solve the above general problem, and an object of the present disclosure is to provide a seat rail locking device for a vehicle, which may apply a method of moving a lock pin in an upward direction to lock a seat rail by moving away from a conventional seat rail locking method of moving the lock pin in a directly downward direction to pass through a floor panel, thereby not causing the interference with the floor panel at all to flexibly apply a battery mounting structure to the floor panel, improving an assembling property as an operator may easily assemble a lock pin guide configured to guide the lock pin to move in upward and downward directions to a movable rail with only one-touch operation, and preventing the lock pin from being damaged or separated by mounting a cap at an upper end of the lock pin.

In order to achieve the object, the present disclosure provides a seat rail locking device for a vehicle including a fixed rail fixedly mounted to a floor panel; a movable rail fastened to the fixed rail to be movable in forward and backward directions; a support plate mounted on the movable rail for assembling with a seat cushion; a lock pin guide provided in a hollow structure in which a spring backing part is formed, and inserted into and fastened to the movable rail; a lock pin inserted into the lock pin guide to be movable in upward and downward directions; a cap provided in a structure in which a spring support part is formed at a circumferential portion of a lower end, and fastened to an upper end of the lock pin; a spring disposed between the spring support part of the cap and the spring backing part of the lock pin guide to be compressible; a track lever that is hinge-fastened to the support plate and connected to the cap; and a locking plate fastened the lower end of the lock pin, moving in an upward direction when the lock pin moves in the upward direction to be inserted into and locked to a locking groove having an opened lower portion formed at an inner end of the fixed rail, and moving in a downward direction together when the lock pin moves in the downward direction to be separated and unlocked from the locking groove of the fixed rail.

The lock pin guide is composed of a hollow guide pipe in which the spring backing part is formed; a mounting plate integrally formed at a circumference of an upper end of the guide pipe and seated on an outer circumferential surface of an assembling hole formed in the movable rail; a fastening support plate formed to extend from a bottom of the mounting plate in a downward direction; and a locking projection formed to protrude from an outer diameter portion of the fastening support plate, and caught and fastened to an inner circumferential surface of the assembling hole of the movable rail.

Preferably, the cap has a structure having an opened bottom, and is provided in a nut cap structure in which a female screw portion for fastening with the lock pin is formed at an inner diameter portion thereof.

Preferably, the upper end of the lock pin is formed with a male screw portion that is screw-coupled to a female screw portion formed at the inner diameter portion of the cap.

The locking plate is composed of a body plate fastened to the lower end of the lock pin; and a plurality of locking parts formed to protrude from both side ends of the body plat, and separably inserted into and fastened to the locking groove of the fixed rail through the movable rail.

Preferably, the movable rail is formed with a plurality of guide holes through which the locking part of the locking plate passes and moves in upward and downward directions.

The track lever is composed of a handle part for a user's folding operation; a connection bar extending from both side ends of the handle part in a backward direction; and a lever bracket having a front end connected to the connection bar, a pressing part connected to the cap formed to be bent on a rear end, and an intermediate portion that is hinge-fastened to an inner surface of the support plate.

Preferably, a coil portion of a return spring is wound around and fixed to the hinge of the lever bracket, but one end of the return spring is connected and fixed to a spring fixed part of the movable rail, and the other end of the return spring is connected and fixed to the pressing part of the lever bracket.

In addition, the support plate is formed with a pressing part guide hole guiding the pressing part of the lever bracket to be bent to a location on the lock pin and located thereto.

The present disclosure provides the following effects through the above configuration.

First, it is possible to apply the method of moving and locking the lock pin in the upward direction by moving away from the conventional seat rail locking method of moving the lock pin in the directly downward direction to pass through the floor panel, thereby not causing the interference with the floor panel at all to flexibly apply the battery mounting structure to the floor panel, and easily providing the battery mounting space in the floor panel.

Second, it is possible to improve the assembling property as the operator may easily assemble the lock pin guide configured to guide the lock pin to move in the upward and downward directions to the movable rail with only one-touch operation.

Third, it is possible to mount the cap at the upper end of the lock pin to protect the lock pin, thereby preventing the lock pin from being damaged or separated.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
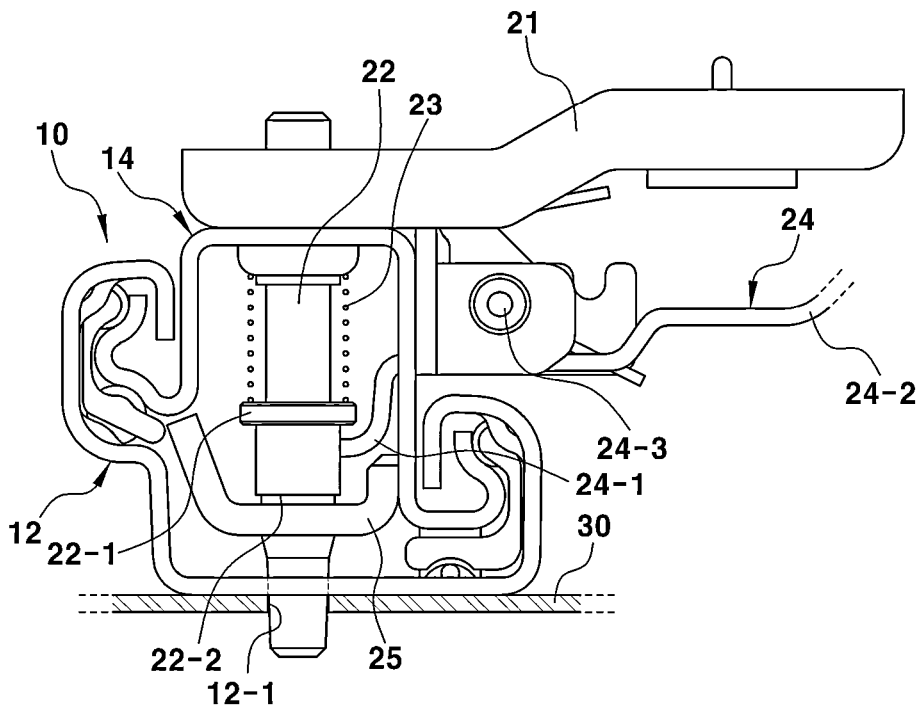
FIG. 1 is a cross-sectional diagram showing a locking state of a seat rail as a conventional manual type seat rail locking device.
Figure 2:
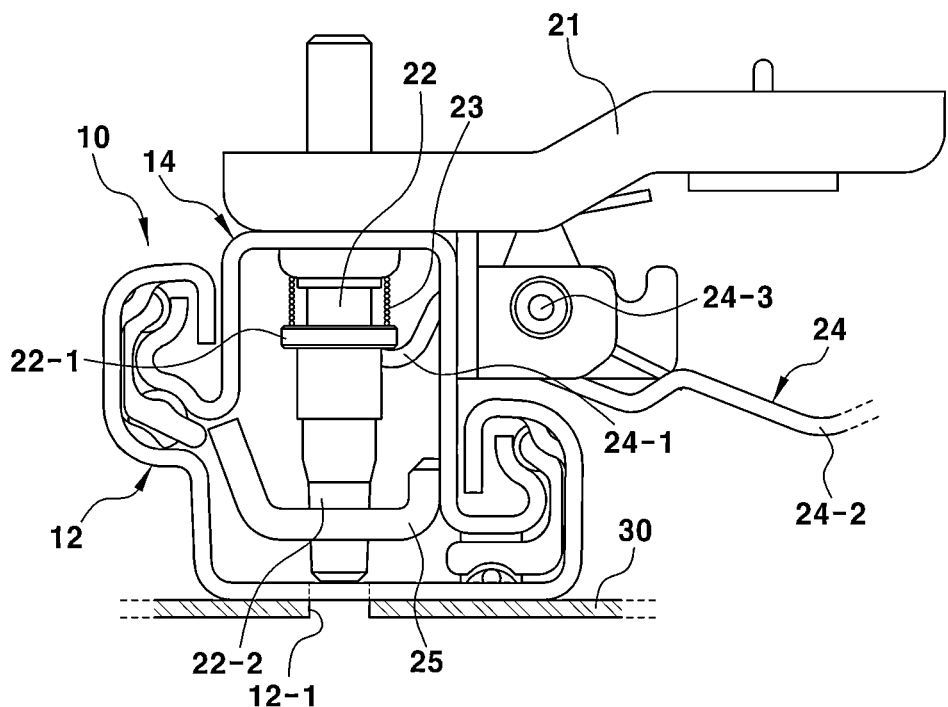
FIG. 2 is a cross-sectional diagram showing the locking state of the seat rail as the conventional manual type seat rail locking device.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings.

Figure 8:
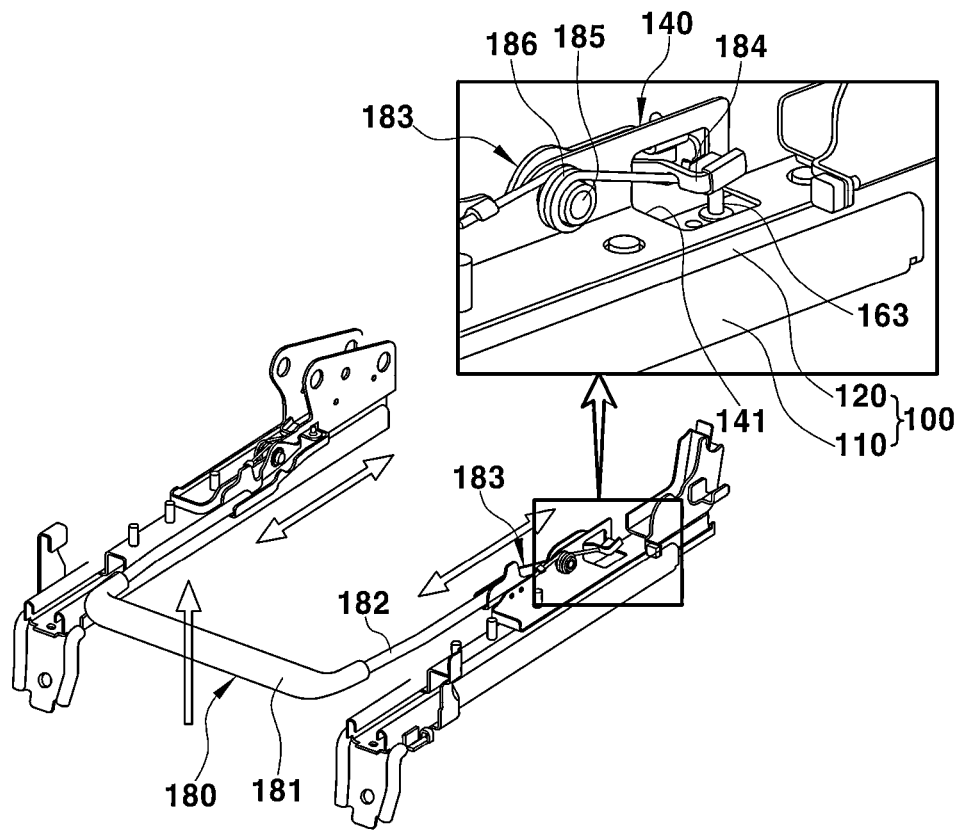
FIG. 8 is a perspective diagram showing a connection structure between a track lever and the cap in the configuration of the seat rail locking device for a vehicle according to the present disclosure.
Figure 9:
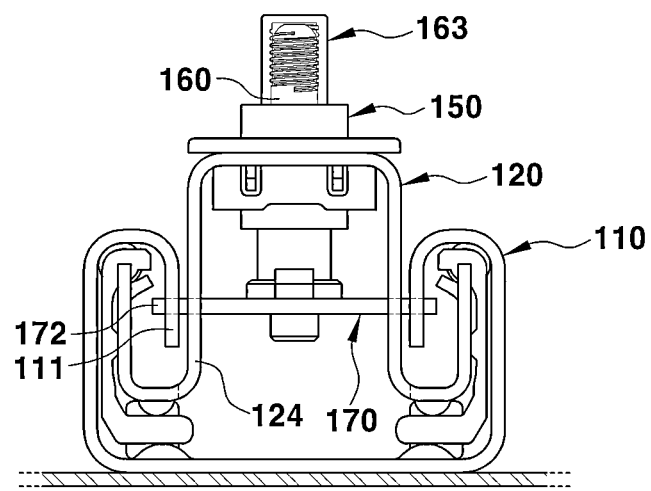
FIG. 9 is a cross-sectional diagram showing a state in which the movable rail is locked as a state in which the seat rail locking device for a vehicle according to the present disclosure is completely assembled.
Figure 10:
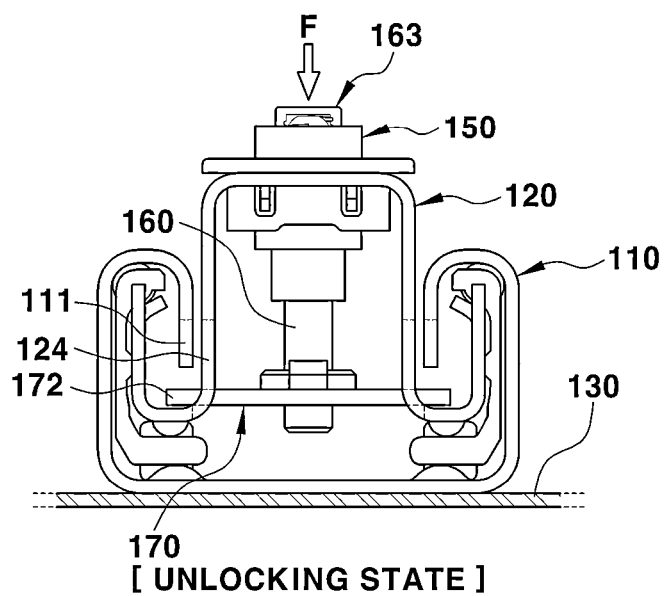
FIG. 10 is a cross-sectional diagram showing a state in which the movable rail is unlocked as the state in which the seat rail locking device for a vehicle according to the present disclosure is completely assembled.

First, referring to FIGS. 8, 9, and 10, a seat rail 100 for a vehicle is basically configured to include a fixed rail 110 fixedly mounted on a floor panel 130 via a mounting bracket, a bolt, etc., and a movable rail 120 fastened to the fixed rail 110 to be slidably moved in forward and backward directions.

According to the present disclosure, in order to maximize a space used for a floor panel of electric vehicles and the like and structurally simplify the seat rail, the fixed rail 110 is manufactured in a structure that has a "U"-shaped cross section and at the same time, has both side ends bent in a downward direction to form an inverted "U"-shaped cross section, and the movable rail 120 is manufactured in a structure that has the inverted "U"-shaped cross section and at the same time, has both side ends bent in an upward direction to form the "U"-shaped cross section.

Accordingly, when the movable rail 120 is fastened to the fixed rail 110 to be slidably movable in the forward and backward directions, the arrangement in which both side ends having the inverted "U"-shaped cross section of the fixed rail 110 and both side ends having the "U"-shaped cross section of the movable rail 120 intersect and overlap with each other is formed.

In addition, a support plate 140 is mounted on the movable rail 120 for assembling with a seat cushion frame.

Here, each component of the seat rail locking device for a vehicle according to the present disclosure will be described as follows.

Figure 3:
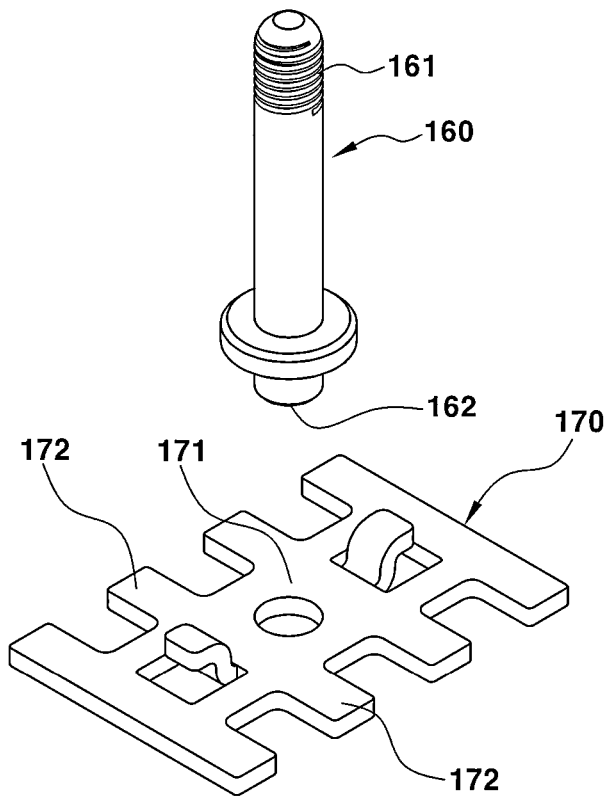
FIGS. 3 and 4 are diagrams showing an assembling structure between a lock pin and a locking plate in a configuration of a seat rail locking device for a vehicle according to the present disclosure.
Figure 4:
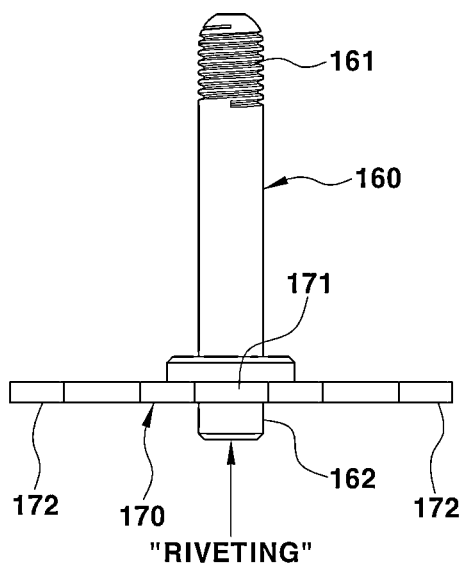
Figure 5:
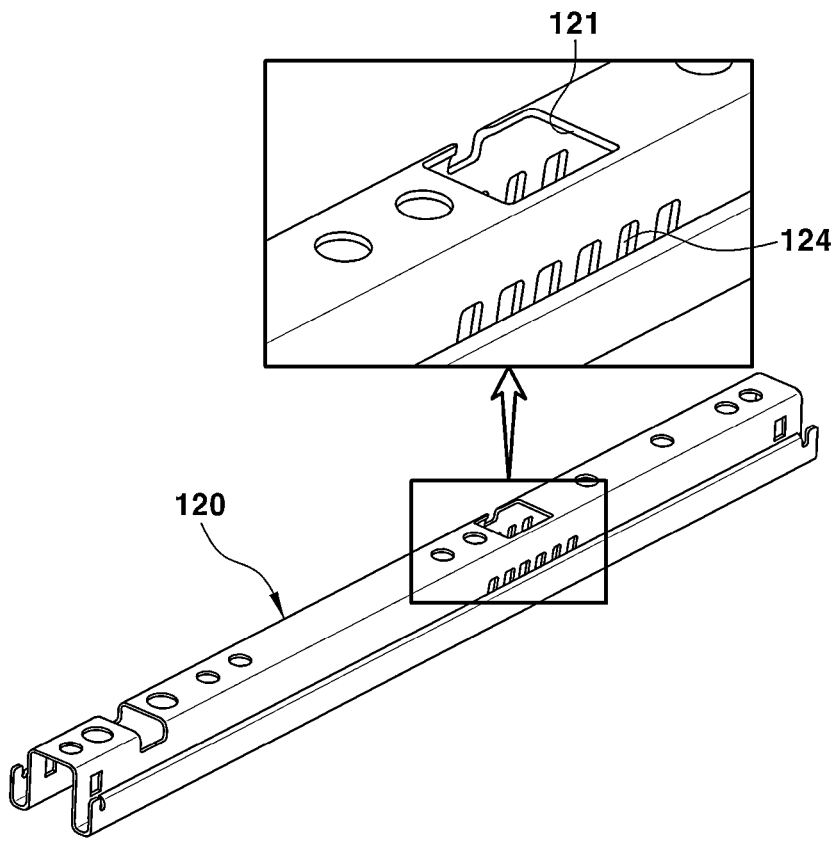
FIG. 5 is a perspective diagram showing a movable rail in the configuration of the seat rail locking device for a vehicle according to the present disclosure.

FIGS. 3 and 4 are diagrams showing an assembling structure between a lock pin and a locking plate in a configuration of a seat rail locking device for a vehicle according to the present disclosure, and FIG. 5 is a perspective diagram showing a movable rail in the configuration of the seat rail locking device for a vehicle according to the present disclosure.

As shown in FIGS. 3 and 4, the lock pin 160 has a circular rod shape of a predetermined length elongated vertically, and is provided in a structure in which an upper end thereof is formed with a male screw portion 161 for fastening with a cap, and a lower end thereof is formed with a riveting part 162 for fastening with a locking plate 170.

In addition, the locking plate 170 is provided in a structure that is fastened to the lock pin 160 to move in an upward direction together when the lock pin 160 moves in the upward direction and inserted into and locked to a locking groove 111 having an opened lower portion formed in an inner end of the fixed rail 110, and move in a downward direction together when the lock pin 160 moves in the downward direction and separated and unlocked from the locking groove 111 of the fixed rail 110.

To this end, the locking plate 170 is composed of a body plate 171 fastened to the riveting part 162 formed at the lower end of the lock pin 160 by riveting, and a plurality of locking parts 172 formed to protrude from both side ends of the body plate 171 and separably inserted into and fastened to the locking groove 111 having the opened lower portion of the fixed rail 110 through the movable rail 120.

At this time, the lock pin 160 and the locking plate 170 integrated by the riveting as described above are first assembled to the movable rail 120.

To this end, as shown in FIG. 5, a rectangular assembling hole 121 into which the lock pin 160 enters to be movable laterally is formed in an upper portion of the movable rail, and a plurality of guide holes 124 through which the locking part 172 of the locking plate 170 passes and flows vertically are formed in both side surfaces of the movable rail 120.

Figure 6:
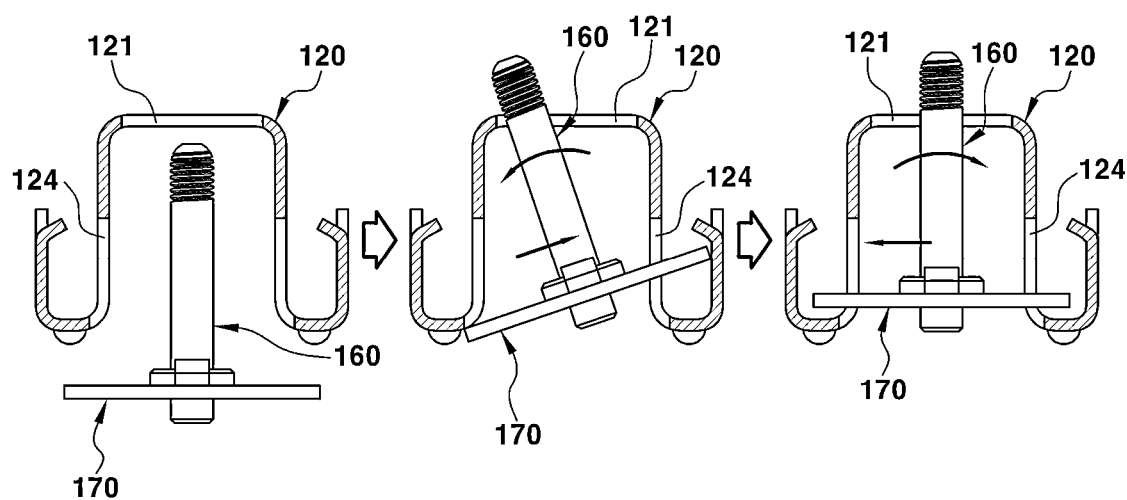
FIG. 6 is a cross-sectional diagram showing a process of assembling the lock pin and the locking plate fastened to each other to the movable rail in the configuration of the seat rail locking device for a vehicle according to the present disclosure.

FIG. 6 is a cross-sectional diagram showing a process of assembling the lock pin and the locking plate fastened to each other to the movable rail in the configuration of the seat rail locking device for a vehicle according to the present disclosure.

Referring to FIG. 6, the lock pin 160 and the locking plate 170 integrated by the riveting as described above are located at the bottom of the movable rail 120, and then enter inside the movable rail 120, an upper end of the lock pin 160 is in a state of being disposed within the assembling hole 121 of the movable rail 120 to be movable laterally.

Subsequently, the lock pin 160 and the locking plate 170 are tilted to one side to insert and mount the locking part 172 of one side of the locking plate 170 into and in the guide hole 124 of one side of the movable rail 120, and then the lock pin 160 and the locking plate 170 are tilted in an opposite direction to insert and mount the locking part 172 of the other side of the locking plate 170 into and in the guide hole 124 of the other side of the movable rail 120, so that the lock pin 160 and the locking plate 170 integrated by the riveting as described above are in a state of being first completely assembled to the movable rail 120.

Next, a process of assembling a lock pin guide 150 to the movable rail 120 and a process of assembling a cap 163 to the lock pin 160 in the configuration of the seat rail locking device for a vehicle according to the present disclosure are performed.

Figure 7:
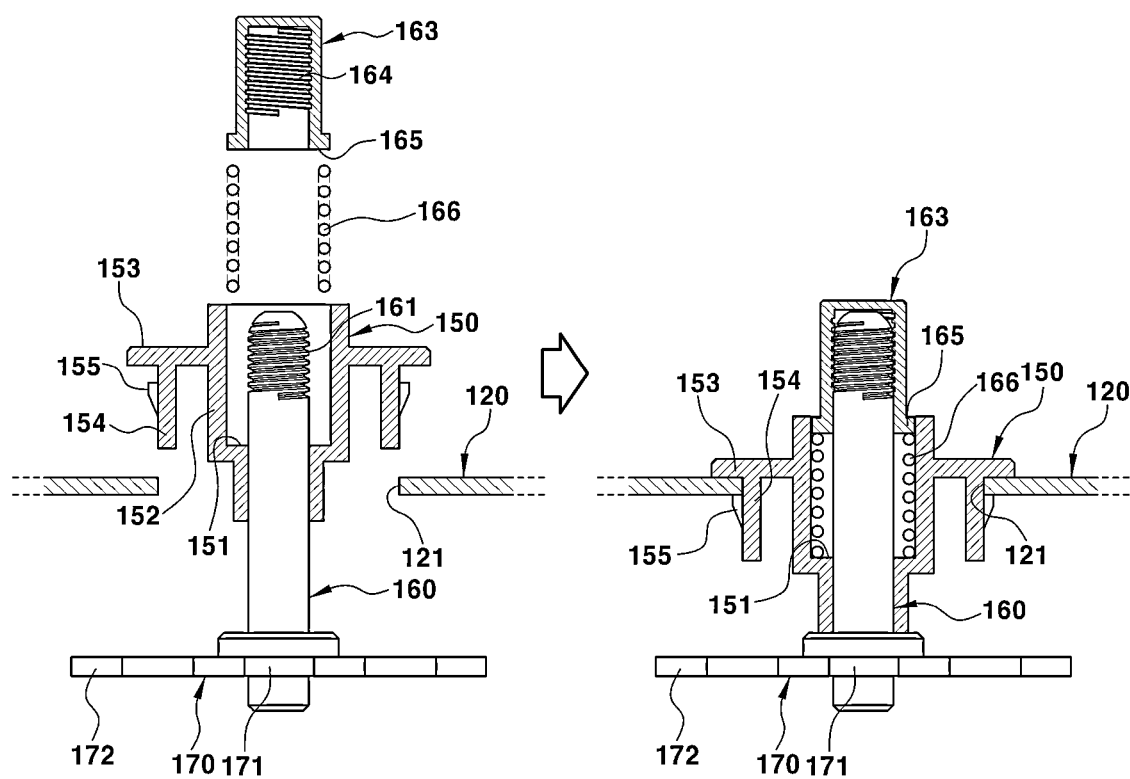
FIG. 7 is a diagram sequentially showing a process of assembling a lock pin guide and a cap in the configuration of the seat rail locking device for a vehicle according to the present disclosure.

FIG. 7 is a diagram sequentially showing a process of assembling a lock pin guide and a cap in the configuration of the seat rail locking device for a vehicle according to the present disclosure.

The lock pin guide 150 is provided in a hollow structure in which a spring backing part 151 is formed, and provided in a structure that is inserted into and fastened to the assembling hole 121 of the movable rail 120 in a one-touch manner.

To this end, the lock pin guide 150 is configured to include a hollow guide pipe 152 in which the spring backing part 151 is formed, a mounting plate 153 integrally formed at a circumferential portion of an upper end of the guide pipe 152 and seated on an outer circumferential surface of the assembling hole 121 of the movable rail 120, a fastening support plate 154 formed to extend from a bottom of the mounting plate 153 in a downward direction, and a locking projection 155 formed to protrude from an outer diameter portion of the fastening support plate 154, and caught and fastened to an inner circumferential surface of the assembling hole 121 of the movable rail 120.

Accordingly, when the fastening support plate 154 of the lock pin guide 150 is inserted into the assembling hole 121 of the movable rail 120 as the lock pin 160 coupled to the locking plate 170 is inserted into the guide pipe 152 of the lock pin guide 150 to be movable in the upward and downward directions, the locking projection 155 formed on the fastening support plate 154 is caught to the inner circumferential surface of the assembling hole 121 of the movable rail 120, so that the lock pin guide 150 is in a state of being easily assembled and fixed to the assembling hole 121 of the movable rail 120 in a one-touch manner.

Subsequently, a spring 166 is inserted into the lock pin 160 inserted into the guide pipe 152 of the lock pin guide 150, and then the cap 163 is fastened to the upper end of the lock pin 160.

Preferably, the cap 163 has a structure having an opened bottom, and is provided in a nut cap structure in which a female screw portion 164 for fastening with the lock pin 160 is formed at an inner diameter portion thereof.

To this end, the male screw portion 161 that is screw-fastened to the female screw portion 164 formed at the inner diameter portion of the cap 163 is formed at the upper end of the lock pin 160, and a spring support part 165 is further formed to protrude from a circumferential portion of a lower end of the cap 163.

Accordingly, the spring 166 is inserted into the lock pin 160 inserted into the guide pipe 152 of the lock pin guide 150, and then the cap 163 is rotated so that the female screw portion 164 of the cap 163 is screw-fastened to the male screw portion 161 of the lock pin 160, so that the cap 163 is in a state of being assembled and fixed to the lock pin 160.

In addition, the spring 166 is in a state of being disposed between the spring support part 165 of the cap 163 and the spring backing part 151 within the guide pipe 152 of the lock pin guide 150 to be compressible.

Meanwhile, when the movable rail 120 is fastened to the fixed rail 110 to be slidably movable in the forward and backward directions, as shown in FIGS. 9 and 10, the locking part 172 of the locking plate 170 passing through the guide hole 124 of the movable rail 120 is in a state of being separably inserted into the locking groove 111 having the opened lower portion formed in the inner end of the fixed rail 110.

FIG. 8 is a perspective diagram showing a connection structure between a track lever and the cap in the configuration of the seat rail locking device for a vehicle according to the present disclosure.

The track lever 180 operated by a user is connected to an upper surface of the cap 163 in order to press the cap 163 fastened to the upper end of the lock pin 160 in an unlocking direction (downward direction).

Referring to FIG. 8, the track lever 180 is hinge-fastened to the support plate 140 mounted on the movable rail 120 and connected to the upper surface of the cap 163.

To this end, the track lever 180 is composed of a handle part 181 for a user's folding operation, a connection bar 182 extending from both side ends of the handle part 181 in a backward direction, and a lever bracket 183 that is hinge-fastened to the inner surface of the support plate 140 and connected to the connection bar 182.

At this time, a front end of the lever bracket 183 is connected to the connection bar 182, a pressing part 184 connected to the upper surface of the cap 163 is formed to be bent at a rear end thereof, and an intermediate portion thereof is fastened to the support plate 140 by a hinge 185.

In addition, a coil portion of a return spring 186 is wound around and fixed to the hinge 185 of the lever bracket 182, but one end of the return spring 186 is fixedly connected to a spring fixed part 125 of the movable rail 120, and the other end of the return spring 186 is fixedly connected to the pressing part 184 of the lever bracket 183.

Preferably, a pressing part guide hole 141 that guides the pressing part 184 of the lever bracket 183 to be bent to a location on the lock pin 160 and located is formed to pass through across horizontal and vertical plate portions of the support plate 140.

Accordingly, the lever bracket 183 is in a state of being rotatably that is hinge-fastened to an inner surface of the vertical plate portion of the support plate 140, but the pressing part 184 of the lever bracket 183 may be easily located on the cap 163 by passing through the pressing part guide hole 141 to be pressable.

Here, an operation flow of the seat rail locking device according to the present disclosure having the above configuration will be described as follows.

FIG. 9 is a cross-sectional diagram showing a state in which the movable rail is locked as a state in which the seat rail locking device for a vehicle according to the present disclosure is completely assembled, and FIG. 10 is a cross-sectional diagram showing a state in which the movable rail is unlocked as the state in which the seat rail locking device for a vehicle according to the present disclosure is completely assembled.

In the locking state of the movable rail 120, the spring 166 disposed between the spring support part 165 of the cap 163 and the spring backing part 151 of the lock pin guide 150 to be compressible exerts an elastic restoring force of pushing up the lock pin 160.

Substantially, even when the elastic restoring force of the spring 166 is applied to the spring support part 165 of the cap 163, the cap 163 is in a state of being fastened to the lock pin 160 by the screw, so that the elastic restoring force of the spring 166 serves as a force of pushing the lock pin 160 in the upward direction.

Accordingly, as shown in FIG. 9, the cap 163 maintains the state of protruding in the upward direction from the lock pin guide 150 without being pressed, and the locking plate 170 fastened to the lower end of the lock pin 160 also maintains the state of moving in the upward direction.

In addition, the locking part 172 of the locking plate 170 passing through the guide hole 124 of the movable rail 120 is inserted into the locking groove 111 having the opened lower portion formed in the inner end of the fixed rail 110, so that the movable rail 120 maintains the state of being locked not to move in the forward and backward directions.

On the other hand, when the user holds and folds the handle 181 of the track lever 180 in the upward direction in order to adjust the front and rear locations of the seat, the lever bracket 183 connected to the connection bar 182 of the track lever 180 is rotated around the hinge 185 and at the same time, the pressing part 184 of the lever bracket 183 is rotated in a downward direction to press the cap 163.

Accordingly, the cap 163 is pressed and the lock pin 160 moves in the downward direction, and the locking plate 170 fastened to the lock pin 160 also moves in the downward direction together.

At this time, as shown in FIG. 10, the locking part 172 of the locking plate 170 escapes and is separated from the locking groove 111 having the opened lower portion formed in the inner end of the fixed rail 110, so that the movable rail 120 is in a state of being movable along the fixed rail 110 in the forward and backward directions.

Accordingly, when the seat moves in the forward and backward directions, the movable rail 120 connected to the seat cushion frame is slid along the fixed rail 110 in the forward and backward direction, so that the user may adjust the desired front and rear locations of the seat.

Of course, when the user completes the adjustment of the front and rear locations of the seat and then releases the handle part 181 of the track lever 180 as it is, the lock pin 160 moves in a upward direction that is a locking direction by the elastic restoring force of the spring 166, and the locking part 172 of the locking plate 170 is inserted into the locking groove 111 having the opened lower portion formed in the inner end of the fixed rail 110 again, so that the movable rail 120 is in a locking state of not being moved in the forward and backward directions again.

As described above, according to the present disclosure, it is possible to apply the method of moving and locking the lock pin 160 in the upward direction by moving away from the conventional seat rail locking method of moving the lock pin in the directly downward direction to pass through the floor panel, thereby not causing the interference with the floor panel 130 at all to flexibly apply the battery mounting structure to the floor panel, and easily providing the battery mounting space in the floor panel.

In addition, it is possible to easily assemble the lock pin guide 150 for guiding the lock pin 160 substantially locking the movable rail 120 to the fixed rail 110 to move in the upward and downward directions to the assembling hole 121 of the movable rail 120 in the one-touch fastening manner, thereby improving the assembling property.

In addition, it is possible to mount the cap 163 at the upper end of the lock pin 160 to protect the lock pin 160, thereby preventing the lock pin 160 from being damaged or separated.

While one embodiment of the present disclosure has been described above in detail, the scope of the present disclosure is not limited to the above-described one embodiment, and various modifications and improvements by those skilled in the art using the basic concept of the present disclosure defined in the appended claims will be also included in the scope of the present disclosure.

What is claimed is:

1. A seat rail locking device for a vehicle, the seat rail locking device comprising:
a fixed rail fixedly mounted to a floor panel;
a movable rail fastened to the fixed rail to be movable in forward and backward directions;
a support plate mounted on the movable rail for assembling with a seat cushion;
a lock pin guide provided in a hollow structure in which a spring backing part is formed, and inserted into and fastened to the movable rail;
a lock pin inserted into the lock pin guide to be movable in upward and downward directions;
a cap provided in a structure in which a spring support part is formed at a circumferential portion of a lower end, and fastened to an upper end of the lock pin;
a spring disposed between the spring support part of the cap and the spring backing part of the lock pin guide to be compressible;
a track lever fastened to the support plate by a hinge and connected to the cap; and
a locking plate fastened to a lower end of the lock pin, moving in an upward direction when the lock pin moves in the upward direction to be inserted into and locked to a locking groove having an opened lower portion formed at an inner end of the fixed rail, and moving in a downward direction together when the lock pin moves in the downward direction to be separated and unlocked from the locking groove of the fixed rail,
wherein the cap has a structure having an opened bottom, and is provided in a nut cap structure in which a female screw portion for fastening with the lock pin is formed at an inner diameter portion thereof.

2. The seat rail locking device of claim 1,
wherein the lock pin guide includes:
a hollow guide pipe in which the spring backing part is formed;
a mounting plate integrally formed at a circumference of an upper end of the guide pipe and seated on an outer circumferential surface of an assembling hole formed in the movable rail;
a fastening support plate formed to extend from a bottom of the mounting plate in a downward direction; and
a locking projection formed to protrude from an outer diameter portion of the fastening support plate, and caught and fastened to an inner circumferential surface of the assembling hole of the movable rail.

3. The seat rail locking device of claim 1,
wherein the upper end of the lock pin is formed with a male screw portion that is screw-coupled to a female screw portion formed at the inner diameter portion of the cap.

4. The seat rail locking device of claim 1,
wherein the locking plate includes:
a body plate fastened to the lower end of the lock pin; and a plurality of locking parts formed to protrude from both side ends of the body plate, and separably inserted into and fastened to the locking groove of the fixed rail through the movable rail, the locking groove comprises a plurality of locking groove and the plurally of locking parts are each separably inserted into respective locking grooves of the plurality of locking groove.

5. The seat rail locking device of claim 4, wherein the movable rail is formed with a plurality of guide holes through which the locking part of the locking plate passes and moves in upward and downward directions.

6. The seat rail locking device of claim 1, wherein the track lever includes:

a handle part having two side ends for a user's pivoting operation;

a connection bar extending from both side ends of the handle part in a backward direction; and a lever bracket having a front end connected to the connection bar, a pressing part connected to the cap formed to be bent on a rear end, and an intermediate portion fastened to an inner surface of the support plate by a hinge.

7. The seat rail locking device of claim 6, wherein a coil portion of a return spring is wound around and fixed to the hinge of the lever bracket, but one end of the return spring is connected and fixed to a spring fixed part of the movable rail, and another end of the return spring is connected and fixed to the pressing part of the lever bracket.

8. The seat rail locking device of claim 6, wherein the support plate is formed with a pressing part guide hole guiding the pressing part of the lever bracket to be bent to a location on the cap and located thereto.

\* \* \* \* \*